United States Patent [19]

Lawrence et al.

[11] 4,277,288

[45] Jul. 7, 1981

[54] FLUIDIZED GRANULATION OF PIGMENTS USING ORGANIC GRANULATING ASSISTANT

[75] Inventors: Simon G. Lawrence, Paisley; James Hossack, Glasgow, both of Scotland

[73] Assignee: Ciba-Geigy Corporation, Ardsley, N.Y.

[21] Appl. No.: 81,235

[22] Filed: Oct. 2, 1979

[30] Foreign Application Priority Data

Oct. 6, 1978 [GB] United Kingdom ............... 39682/78

[51] Int. Cl.$^3$ .......................... C09C 3/08; C09C 3/10
[52] U.S. Cl. ................. 106/309; 23/313 FB; 106/288 B; 106/288 Q; 106/298; 106/300; 106/302; 106/304; 106/307
[58] Field of Search .......................... 23/313 FB, 314; 106/288 B, 298, 302, 309, 288 Q, 300, 304, 307

[56] References Cited

U.S. PATENT DOCUMENTS

| | | | |
|---|---|---|---|
| 2,511,088 | 6/1950 | Whaley, Jr. ................. | 23/313 FB X |
| 2,684,290 | 7/1954 | Alexander et al. .................... | 23/314 |
| 3,001,228 | 9/1961 | Nack ......................... | 23/313 FB UX |
| 3,391,234 | 7/1968 | Walenciak et al. ................ | 23/314 X |
| 3,773,536 | 11/1973 | Batten et al. .......................... | 106/309 |
| 4,055,439 | 10/1977 | Babler et al. .................... | 106/309 X |

FOREIGN PATENT DOCUMENTS

2844710 4/1979 Fed. Rep. of Germany ...... 23/313 FB
1401304 7/1975 United Kingdom .

*Primary Examiner*—Bradley Garris
*Attorney, Agent, or Firm*—Luther A. R. Hall

[57] ABSTRACT

A process for producing a substantially dry, low dusting, free flowing granular pigment composition comprises (a) contacting a fluidized bed of pigment and a granulating assistant, (b) optionally contacting the granules so obtained with a surfactant and (c) removing the dry granules from the bed.

18 Claims, 1 Drawing Figure

FLUIDIZED GRANULATION OF PIGMENTS USING ORGANIC GRANULATING ASSISTANT

The present invention relates to the granulation of pigments in a fluid bed process.

Various fluid bed techniques are already known for the production of materials e.g. pharmaceuticals, agricultural chemicals, dyestuffs, tanning agents, optical brighteners and foodstuffs, in granular form. In a known continuous process, e.g. that described in British Pat. No. 1,401,304, a feed solution, suspension or melt, optionally containing a binder, is sprayed into a drying chamber, through which is blown hot air. Granules are formed and removed continuously; the granules being built up by spray being directed onto previously dried material and subsequent aggregation of such wetted out particles. In this continuous process, drying and granulation thus occur in a single stage.

A batch fluid-bed granulation technique has also been described in which a powder-form starting-material is introduced into a fluid bed and sprayed with a solution or emulsion of a binder material. In this way, particles of the active material are coated with the binder, and granules are formed by aggregation of the coated particles.

This technique is effected on a batch basis and the starting material has been at least partly dried before introduction into the process.

Neither of these known granulation techniques has thus far been successfully applied to pigment starting materials. The reason, possibly, is that it would have been expected that such relatively severe granulation and/or drying processes, when applied to a pigment, would have had a very disadvantageous effect upon the dispersibility properties of the granular pigment particles rendering them entirely unsuitable for use.

In German Offenlegungsschrift No. 2 844 710, there is described a process for producing a substantially dry, low dusting, free flowing granular pigment composition comprising contacting a fluidised bed of pigment, a surfactant as granulating assistant and water; and removing dry granules from the bed.

We have now found that by using a related process, but based on non-aqueous systems, pigment products are obtained which can be readily incorporated into application media.

Accordingly, the present process provides a process for producing a substantially dry, low dusting, free flowing granular pigment composition, comprising (a) contacting a fluidised bed of pigment and a granulating assistant, as hereinafter defined (b) optionally, contacting the granules so obtained with a surfactant; and (c) removing dry granules from the bed.

A particularly suitable pigment powder starting material is that produced in a conventional dry grinding or sieving process. If desired, prior to use in the present process, such dry-ground pigment powder may be treated to render it more suitable for granulation e.g. by changing its surface properties by chemical means or by grinding less finely—the coarser the powder the less surface to be wetted out and bonded.

Further suitable pigment starting material can be produced from dryers which give pigments directly in powder form. Such pigment powders may be fully or partially dry and may be already low dusting.

While it is preferred to charge pigment powder to the container, semi-dried or even presscake could be charged, and the initial drying could be effected in the container prior to spraying.

Step (b) of the process of the present invention may be omitted when the starting material is relatively low dusting. However, when the pigment powder starting material is relatively dusty, the stage (b) of the present process is preferably applied in order to increase the size and free-flowing capability of the granules obtained in stage (a). Thus in stage (a) the granulating assistant de-dusts the starting pigment powder giving small granules, and in the second stage (b) these small granules are caused to adhere together producing larger granules.

The pigment starting material may be an organic pigment or an inorganic pigment. Examples of organic pigments are azo and azomethine pigments or their metal salts or metal complexes; metal free- and metal phthalocyanines which may be substituted by halogen; polycyclic pigments such as quinacridones, dioxazines, vat dyestuffs, anthraquinones and isoindolinones and salts of basic pigments precipitated with the heteropoly acids of phosphorus, tungsten, molybdenum or copper ferrocyanide. Inorganic pigments which may be used include titanium dioxide, red and yellow iron oxides, carbon black, lead and molybdenum chromes, prussian blues and cadmium reds.

The granulating assistant used in the process of the present invention is defined as any material or mixture of materials which:

(i) wets out the pigment powder surface sufficiently to allow agglomeration of pigment particles so wetted out, (ii) binds granules so formed sufficiently strongly to enable them to resist breakdown during the process and during subsequent handling and storage, but without adversely affecting dispersibility in the final application medium, and (iii) is compatible with the final application medium; the word "compatible" when used throughout this specification and claims does not require the granulating assistant and final application medium to be compatible over the whole concentration range from 0% additive: 100% medium up to 100% additive: 0% medium, it is only necessary that, when the application medium is pigmented with the granules to give the required degree of pigmentation, the additive remains in solution.

The granulating assistant should desirably also function to improve the properties of the pigment in its end application.

Examples of granulating assistants which may be used in the process of the present invention include:

(a) organic liquid alone

This system may be used e.g. when the surface area of the starting material is rather low e.g. when using inorganic pigments and when the pigment starting material already contains some resin, for example at least 20% by weight of resin. In such cases, a spray of solvent alone onto the pigment/resin particles, renders the resin slightly sticky so that the particles adhere to each other when they collide.

Examples of organic liquids which prove useful in this embodiment of the present process are straight-chain aliphatic- or cyclic-aliphatic hydrocarbon solvents, having high boiling- and flash points, and optionally containing aromatic solvents e.g. up to 20% by weight of aromatics; conventional liquid plasticizers for P.V.C. e.g. dialkyl adipates and sebacates; as well as dialkyl esters of phthalic acid e.g. dioctyl phthalate; oleyl alcohol; and other esters having a high boiling point.

(b) organic liquid/resin systems

These systems are the preferred systems:

Any resin may be used which is soluble in the solvent, compatible with the final application medium and stable on storage in air. Examples of suitable resins are abietic acid and esters thereof; diglycol monostearate, cellulose acetobutyrates; alkaline earth metal salts of fatty acids having 12 to 20 carbon atoms e.g. stearic acid; fatty acids having 12 to 20 carbon atoms; fatty alcohols; amines having 12 to 20 carbon atoms e.g. stearylamine or rosin amine; triglycerides of 12-hydroxystearic acid; maleic and phenolic resins modified with abietic acid; wood rosins modified by hydrogenation or polymerisation; glyceryl esters of modified resins; alkyd resins; alkyd resins with synthetic fatty acids; linseed oil-based resins, castor oil resins; and polyester resins based on phthalic acid.

Preferred solvents for use in this embodiment of the process, are those set forth under (a) hereinbefore.

(c) organic liquid/wax systems

Any wax may be used which is compatible with the final application medium stable on storage in air and in combination with organic liquids is capable of being sprayed; thus the wax may be present dissolved in the liquid, or as an emulsion or as a fine dispersion. Moreover, a further practical limitation is that the wax/liquid mixture in the concentration range of from 0.1–50% must not set to a paste in the nozzle during spraying.

Suitable waxes are paraffin waxes, C12-C22 fatty alcohols e.g. cetyl alcohol and polyamide waxes.

Again, suitable organic liquids are those set forth under (a) described hereinbefore.

(d) organic liquid/resin/wax/systems

Any combination of the various organic liquid, resin and wax components, described individually hereinbefore, may be used provided that the total system is capable of being sprayed and is compatible with the end application medium.

(e) molten waxes

Examples of such waxes are low melting polyester waxes. The wax must be capable of being sprayed and be compatible with the final application medium.

The choice of the specific additive system used in any particular instance will depend upon various factors: for instance, the final application e.g. ink, paint or plastics; the nature of the pigment surface and its surface area; and the presence or absence of additives in the starting pigment material.

The amount of the granulating assistant used may be from 5 to 50%, based on the weight of the pigment. Preferably from 5 to 20% by weight of granulating assistant is used; the dustier the pigment, the higher the amount of additive system, to achieve a satisfactory degree of granulation.

In those embodiments in which the granulating assistant is sprayed during the process, the temperature of the granulating assistant may be between room temperature and 100° C., and the temperature of the fluidised pigment bed between room temperature and 100° C. preferably between room temperature and 60° C. When waxes are used, the spraying temperature must be sufficiently high to ensure that the wax does not solidify in the jet, while for mixtures of resins/binders in organic liquids the temperature is chosen so that the viscosity of the mixture is such as to permit satisfactory spraying and that the spray droplets wet out the pigments and allow granulation to take place. The concentration of resin/binder system in the organic liquid may be varied over a wide range, on one hand there must be adequate resin/binder present to ensure granules are formed while on the other hand the upper concentration is limited by the fact that the viscosity of the system must permit satisfactory spraying.

The granulating assistant may be sprayed on to the bed by continuous addition viz. the total system is sprayed in one batch; by cyclic addition viz. aliquots of system are sprayed with pauses between each aliquot; or by multi-stage stage addition viz. the bed is first sprayed e.g. with solvent to moisten it and then sprayed in a second stage, e.g. with a solvent/resin or a molten wax.

Figure 1:
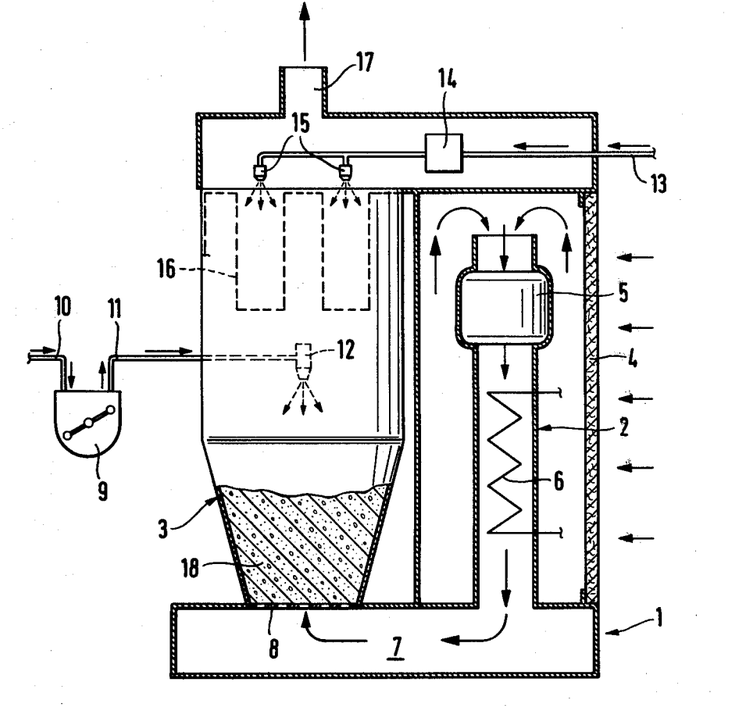

In one embodiment, the process of the invention is carried out on a batchwise basis, in a machine of the type described in the FIGURE of the accompanying drawing.

In order that the invention may be better understood, and its preferred features explained, a preferred embodiment of the invention will now be described with reference to the accompanying drawing which is a diagrammatic side view, partly in section, of an apparatus for carrying out the process of the invention.

The apparatus comprises a container 1, consisting of an air-heating compartment 2 and, interconnected therewith, a fluid bed compartment 3. The air-heating compartment 2 is equipped with an air filter 4, a suction fan 5 and a heater 6. In an alternative apparatus (not shown), fan 5 is situated in outlet port 17 so that air is drawn rather than forced through the fluid bed. Compartments 2 and 3 are connected by a duct 7 having an air distributor plate 8, forming a partition with the fluid bed compartment 3.

The fluid bed compartment 3 has a spray unit comprising a metering pump 9, with an inlet 10 for the granulating assistant and an outlet 11 leading to a nozzle head 12. Above the nozzle head 12 are situated filter bags 16 to retain the material to be granulated within the fluid bed compartment 3. Above the bag filters, there is situated a filter bag cleaning unit comprising an inlet 13, a timer 14 and air jets 15.

At the top of the fluid bed compartment 3 there is an air exhaust port 17. The material to be granulated is placed at the bottom of the fluid bed compartment 3, in the space 18.

The process of the invention is carried out using the apparatus illustrated, as follows:

Stage (a)

Dry pigment powder, with or without additives as desired is charged into space 18 of the fluid bed compartment 3. Air produced in compartment 2 is blown through the pigment bed to fluidise it. The inlet air temperature at the fluid bed is within the range 20° to 100° C., normally 20° to 60° C., and the outlet air temperature from the bed is in the range 20° to 50° C. depending upon the inlet temperature, the temperature of the additive system and the rate of dispensation of the latter. The rate of air flow through the fluid bed is adjusted to give suitable fluidisation of the powder. The rate of the air flow will vary depending upon such factors as machine size, batch size, pigment particle size and density. For a given system it can also be varied during the granulation cycle e.g. as the pigment particle size, shape and density changes progressively and thereby change in fluidisation characteristics.

Air is turned onto the filter bag cleaning unit, allowing a periodic air pulse to blow off any pigment adhering to the filter bags, or, alternatively, the pigment may be shaken off the bags. Fine dust is therefore continually removed and returned to the fluidised granulation space 18. The material to be sprayed is metered to the nozzle head 12 whereat it is atomized with or without compressed air depending on nozzle design. Spraying time can vary depending upon the granulating assistant concentration in the spray, the amount of granulating assistant required, and the way in which the granulating assistant is added viz. continuous addition, cyclic addition or by multi-stage addition as described earlier. The spraying time is between 5 mins and 60 mins, normally 10-30 mins.

Stage (b)

Without requiring to re-charge the machine or open it, the mini-granules formed in stage (a) are treated with a surfactant.

The surfactant may be of the non-ionic, cationic or anionic type.

Typical non-ionic surfactants include those falling within the following sub-groups:

(a) monoethers of polyglycols with long-chain fatty alcohols. For instance, the condensation product of from 5 to 20 moles of ethylene oxide with a $C16$-$C18$ fatty alcohol e.g. cetyl alcohol.

(b) monoesters of polyglycols with long-chain fatty acids; for instance, the condensation products of 5 to 20 moles of ethylene oxide with a fatty acid having 12 to 18 carbon atoms, for example lauric acid or stearic acid. A specific example is polyoxyethylene monolaurate.

(c) monoethers of polyglycols with alkyl-phenols; for instance the reaction production of from 5 to 20 moles of ethylene oxide with a $C6$-$12$ alkyl phenol, e.g. nonyl phenol.

(d) N,N-polyethoxylated long-chain fatty amines; for instance the reaction production of from 5 to 50 moles of ethylene oxide with a $C12$-$C18$ fatty amine e.g. cocoamine and tallow amine.

(e) N,N-polyethoxylated long-chain fatty acid amides; for instance, the reaction product of from 5 to 50 moles of ethylene oxide with hydrogenated tallow amide.

(f) ester/ethers of polyglycols with cyclic alcohols and fatty acids.

Specific examples are polyoxyethylene sorbitan oleate or laurate.

Typical cationic surface-active agents include primary and secondary amines and alkyl propylene diamines. These amines are typically used either as the $C_1$-$C_4$ carboxylic acid salt or as derived quaternary ammonium compounds to give a solution dispersion or emulsion suitable for spraying.

The anionic surfactants may be alkali metal, ammonium or amine salts (especially volatile amines of low molecular weight such as morpholine or triethylamine) of fatty carboxylic acids and sulphonic acids of fatty amine sulphates. Examples are alkali metal stearates; alkali metal alkyl sulphonates e.g. potassium dodecyl sulphonates; alkali metal alkaryl sulphonates e.g. sodium dodecyl benzene sulphonate; fatty acid sarcosinates; sulphonated alkyl esters of long chain fatty acids and alkyl sulphosuccinates; sulphonated monoethers of polyglycols with alkylphenols e.g. nonylphenols; and especially the ammonium salt of partly hydrogenated wood rosin.

The surfactant may be used alone or as a mixture of different surfactants, or used in conjunction with, a binder and/or an applicational agent known to improve the properties of a pigment.

Water soluble polymeric agents are of particular value as binders. They may be anionic or nonionic in nature. Typical products are modified cellulose derivatives such as hydroxyethyl cellulose, hydroxypropyl cellulose, sodium carboxymethyl cellulose, polyvinyl alcohol of varying degrees of hydrolysis from the acetate and polyvinyl pyrrolidone.

The temperature of the fluidised bed is raised to a suitable drying temperature by adjusting the inlet temperature to a temperature within the range of from 20° to 100° C. Before commencing to spray on the aqueous additive, the air outlet temperature is allowed to rise to a temperature which is usually between 30° C. and 50° C., the actual temperature being dependent upon, the rate of air flow and the type of granulator being used. The additive system is then metered into the machine and sprayed onto the fluidised bed, thus altering the outlet temperature depending upon the additive system, its rate of addition and the rate of air flow through the bed. The rate of air flow depends upon the factors mentioned above in stage (a) and may also vary during the granulation cycle. The machine functions are described in stage (a). The spraying times vary between 10 minutes and 2 hours and are influenced by e.g. the amount of additive system and the air flow.

Finally, in stage (c) the granules formed are optionally cooled and removed from the fluid bed space 18.

The products of the process of the present invention are substantially dry (containing not more than 2% by weight of water in most cases), low dusting, easily handleable free-flowing, meterable pigment granules which enable working environments to be cleaner and more free of health hazards.

The following Examples further illustrate the present invention. Where a stage two process is described in the Examples, the second stage follows on immediately after the first stage.

Example 1

Dry pigment powder was charged to the container of the apparatus shown in the FIGURE. The process is summarised as follows:

(a) Product Composition:

86.95% CI Pigment Yellow No. 13 (prepared as described in BP 1356253)

13.05% Mineral Oil.

(b) Physical Properties:

Appearance—a free flowing low dusting granular powder.

Size Analysis:

| <0.3 mm | 0.3–0.7 mm | >0.7 mm |
|---|---|---|
| 27% | 72% | 1% |

(c) Process Conditions:

| | |
|---|---|
| Temp. of pigment bed | 21° C. |
| Temp. of the granulating agent | 21° C. |
| Air Flow | 10–15 m³/hour |

-continued

| Pigment Charge | 250 parts (by weight) of above pigment |
| --- | --- |
| Granulating assistant | 37.5 parts (by weight) Mineral Oil. |
| Spraying Pressure | 0.2 atmosphere |
| Spraying Time | 6–8 minutes |
| Drying Time | — |

(d) Application Properties:

The application properties of the granules and the starting powder were compared by incorporating equal amounts of pigment in each case into a lithographic printing medium. The resulting lithographic inks were then examined and, within practical limits, no differences in application properties were observed.

EXAMPLE 2

Dry pigment powder was charged to the container of the apparatus shown in the FIGURE. The process is summarised as follows:

(a) Product Composition:
86.94% CI Pigment Yellow 13
6.53% Staybelite Resin (partly hydrogenated wood rosin)
6.53% Mineral Oil (b) Physical Properties:
Appearance—a low dusting granular powder.
Size Analysis:

| <0.3 mm | 0.3–0.7 mm | >0.7 mm |
| --- | --- | --- |
| 34% | 49% | 17% |

(c) Process Conditions:

| Temp. of pigment bed | 75° C. |
| --- | --- |
| Temp. of the granulating agent | 60° C. |
| Air Flow | 10–15 m³/hour |
| Pigment Charge | 250 parts (by weight) CI Pigment Yellow 13 |
| Granulating assistant | 37½ parts (by weight) of composition 50% Staybelite Resin 50% Mineral Oil |
| Spraying Pressure | 0.2 atmosphere |
| Spraying Time | 6–8 minutes |
| Drying Time | — |

(d) Application Properties:

The application properties of the granules and the starting powder were compared by incorporating equal amounts of pigment in each case into a lithographic printing ink medium. The resulting litho inks were then examined and, within practical limits, no differences in application properties were observed.

EXAMPLE 3

Dry pigment powder was charged to the container of the apparatus shown in the FIGURE. The process is summarised as follows:

(a) Product Composition:
90.9% CI Pigment Yellow No. 13
6.83% Di-octyl phthalate
2.27% "Staybelite" Resin (b) Physical Properties:
Appearance—a low dusting granular powder.
Size Analysis:

| <0.3 mm | 0.3–0.7 mm | >0.7 mm |
| --- | --- | --- |
| 25% | 74% | 1% |

(c) Process Conditions:

| Temp. of pigment bed | 21° C. |
| --- | --- |
| Additive Temp. of the granulating agent | 21° C. |
| Air Flow | 10–15m³/hour |
| Pigment Charge | 250 parts (by weight) CI Pigment Yellow 13 |
| Granulating assistant | 25 parts (by weight) of composition 25% Staybelite resin 75% Di-octyl phthalate |
| Spraying Pressure | 0.2 atmospheres |
| Spraying Time | 6–8 mins. |
| Drying Time | — |

(d) Application Properties:

The application properties of the granules and the starting powder were compared by incorporating equal amounts of pigment in each case into plasticised PVC. The resulting PVC hides were then examined and, within practical limits, no differences in application properties were observed.

EXAMPLE 4

Dry pigment powder was charged to the container of the apparatus shown in the FIGURE. The process is summarised as follows:

(a) Product Composition:
86.95% CI Pigment Yellow No. 13 (prepared as described in BP 1356253)
2.18% Staybelite Resin
4.35% Polyester Wax
6.52% Mineral Oil (b) Physical Properties:
Appearance—a low dusting granular powder.
Size Analysis:

| <0.3 mm | 0.3–0.7 mm | >0.7 mm |
| --- | --- | --- |
| 22% | 67% | 11% |

(c) Process Conditions:

| Temp. of pigment bed | 21° C. |
| --- | --- |
| Temp. of the granulating agent | 50–60° C. |
| Air Flow | 10–15 m³/hour |
| Pigment Charge | 250 parts (by weight) of above pigment |
| Granulating agent | 37½ parts (by weight) of composition 16⅔% Staybelite Resin 33⅓% Polyester Wax 50% Mineral Oil |
| Spraying Pressure | 0.2 atmospheres |
| Spraying Time | 6–8 minutes |
| Drying Time | — |

(d) Application Properties:

The application properties of the granules and the starting powder were compared by incorporating equal amounts of pigment in each case into a lithographic ink medium. The resulting inks were then examined and, within practical limits, no differences in application properties were observed.

EXAMPLE 5

Dry pigment powder was charged to the container of the apparatus shown in the FIGURE. The process is summarised as follows:

(a) Product Composition:
90.66% CI Pigment Yellow No. 13 (prepared as described in BP 1356253)
1.51% Staybelite Resin
7.53% Mineral Oil
0.3% Klucel M (hydroxypropyl cellulose).

(b) Physical Properties:
Appearance—a low dusting free flowing granular powder.
Size Analysis:

| <0.15 mm | 0.15–0.3 mm | 0.3–0.5 mm | 0.5–0.7 mm | 0.7–1.0 mm | >1.0 mm |
|---|---|---|---|---|---|
| 4.5% | 17.9% | 62.2% | 7.6% | 3.4% | 4.4% |

(c) Process Conditions:

| | |
|---|---|
| 1st Stage. Temp. of pigment bed | 21° C. |
| Temp. of the granulating agent | 90° C. |
| Air flow | 10–15m³/hour |
| Pigment Charge | 250 parts (by weight) of above pigment |
| Granulating agent | 25 parts (by weight) of composition 16.67% Staybelite Resin 83.33% Mineral Oil |
| Spraying Pressure | 0.2 atmosphere |
| Spraying Time | 6–8 minutes |
| Drying Time | — |
| 2nd Stage. Temp. of pigment bed | 90° C. |
| Temp. of additive | 21° C. |
| Air Flow | 10–15m³/hour |
| Additive | 220 parts (by weight) of composition 0.34% Klucel M 4.5% Ammonia Solution (SG = 0.880) 95.16% Water |
| Spraying Pressure | 0.2 atmosphere |
| Spraying Time | 50 minutes |
| Drying Time | 10 minutes |

(d) Application Properties:
The application properties of the granules and the starting powder were compared by incorporating equal amounts of product in each case into a lithographic printing ink medium. The resulting inks were then examines, and, within practical limits, it was found that the difference in colour strength which existed was commensurate with the amount of additive in the granular product.

EXAMPLE 6

Dry pigment powder was charged to the container of the apparatus shown in the FIGURE. The process is summarised as follows:

(a) Product Composition:
88.89% CI Pigment No. 15.3
8.89% Paraffinic spindle oil
0.44% Carboxy Methyl Cellulose
1.78% Staybelite Resin (b) Physical Properties:
Appearance—granular powder, which visibly shows less dust than the starting product.
Size Analysis:

| <0.3 mm | 0.3–0.5 mm | >0.5 mm |
|---|---|---|
| 21.7% | 29.3% | 49% |

(c) Process Conditions:

| | |
|---|---|
| 1st Stage. Temp. of pigment bed | 90° C. |
| Temp. of granulating agent | 21° C. |
| Air Flow | 10–15m³/hour |
| Pigment Charge | 250 parts (by weight) CI Pigment 15.3 |
| Granulating agent | 25 parts (by weight) paraffinic spindle oil |
| Spraying Pressure | 0.2 atmosphere |
| Spraying Time | 6–8 mins. |
| Drying Time | — |
| 2nd Stage. Temp. of pigment bed | 90° C. |
| Temp. of additive | 21° C. |
| Air Flow | 10–15m³/hour |
| Additive | 210 parts (by weight) of composition 0.6% carboxy methyl cellulose 2.38% Staybelite resin (present on Ammonium Staybelite) 5.7% ammonia solution (SG = 0.880) 91.32% water |
| Spraying Pressure | 0.2 atmosphere |
| Spraying Time | 40 mins. |
| Drying Time | 5 mins. |

(d) Application Properties:
The application properties of the granules and the starting powder were compared by incorporating equal amounts of product in each case into a lithographic ink medium. The resulting inks were then examined, and, within practical limits, it was found that the difference in colour strength which existed was commensurate with the amount of additive in the granular product.

EXAMPLE 7

Dry pigment powder was charged to the container of the apparatus shown in the FIGURE. The process is summarised as follows:

(a) Product Composition:
90.9% CI Pigment Red No. 101
9.1% Mineral Oil (b) Physical Properties:
Appearance—a low dusting free flowing granular powder.
Size Analysis:

| <0.3 mm | 0.3–0.5 mm | >0.5 mm |
|---|---|---|
| 17.1% | 26.9% | 56% |

(c) Process Conditions:

| | |
|---|---|
| Temp. of pigment bed | 21° C. |
| Temp. of granulating agent | 90° C. |
| Air Flow | 10–15m³/hour |
| Pigment Charge | 500 parts (by weight) of CI Pigment Red 101 |
| Granulating agent | 50 parts (by weight) of mineral oil. |

-continued

| Spraying Pressure | 0.2 atmosphere |
|---|---|
| Spraying Time | 12-14 minutes |
| Drying Time | — |

(d) Application Properties:

The application properties of the granules and the starting powder were compared by incorporating equal amounts of product in each case into a decorative paint medium. The resulting paints were then examined, and, within practical limits, it was found that the difference in colour strength which existed was commensurate with the amount of additive in the granular product.

EXAMPLE 8

Dry pigment powder was charged to the container of the apparatus shown in the FIGURE. The process is summarised as follows:

(a) Product Composition:
86.95% CI Pigment Yellow 62.1
13.05% Oleyl Alcohol (b) Physical Properties:
Appearance—a low dusting granular powder.
Size Analysis:

| <0.15 mm | 0.15-0.3 mm | 0.3-0.5 mm | >0.5 mm |
|---|---|---|---|
| 11.4% | 31.4% | 26.8% | 30.4% |

(c) Process Conditions:

| Temp. of pigment bed | 90° C. |
|---|---|
| Temp. of granulating agent | 21° C. |
| Air Flow | 10-15m$^3$/hour |
| Pigment Charge | 250 parts (by weight) of CI Pigment Yellow 62.1 |
| Granulating Agent | 37.5 parts (by weight) of oleyl alcohol |
| Spraying Pressure | 0.2 atmosphere |
| Spraying Time | 10-12 minutes |
| Drying Time | — |

(d) Application Properties:

The application properties of the granules and the starting powder were compared by incorporating equal amounts of pigment in each case into a plasticized PVC. The resulting PVC hides were then examined and, within practical limits, no differences in application properties were observed.

EXAMPLE 9

Dry pigment powder was charged to the container of the apparatus shown in FIGURE. The process is summarised as follows:

(a) Product Composition:
85.80% CI Pigment Yellow No. 109
12.87% Mineral Oil
0.43% Carboxy-methyl cellulose
0.90% Staybelite Resin (b) Physical Properties:
Appearance—a low dusting granular powder.
Size Analysis:

| <0.3 mm | 0.3-1.0 mm | 1.0-1.6 mm | >1.6 mm |
|---|---|---|---|
| 20.8% | 30.3% | 24% | 24.9% |

(c) Process Conditions:

| | | |
|---|---|---|
| 1st Stage. | Temp. of pigment bed | 90° C. |
| | Temp. of granulating agent | 21° C. |
| | Air Flow | 10-15m$^3$/hour |
| | Pigment Charge | 250 parts (by weight) of CI Pigment 109 |
| | Granulating agent | 37.5 parts (by weight) of mineral oil |
| | Spraying Pressure | 0.2 atmosphere |
| | Spraying Time | 10-12 minutes |
| | Drying Time | — |
| 2nd Stage. | Temp. of pigment bed | 90° C. |
| | Temp. of additive | 21° C. |
| | Air Flow | 10-15m$^3$/hour |
| | Additive | 175 parts (by weight) of composition: 0.7% carboxy methyl cellulose 1.5% Staybelite Resin (present as Ammonium Staybelite) 5.7% Ammonia Solution (SG = 0.880) 92.1% water |
| | Spraying Pressure | 0.2 atmosphere |
| | Spraying Time | 25 minutes |
| | Drying Time | 5 minutes |

(d) Application Properties:

The application properties of the granules and the starting powder were compared by incorporating equal amounts of pigment in each case into an industrial paint medium (Alkyd/Melamine). The resulting paints were then examined and, within practical limits, no differences in application properties were observed.

EXAMPLE 10

Dry pigment powder was charged to the container of the apparatus shown in the FIGURE. The process is summarised as follows:

(a) Product Composition:
86.95% CI Pigment Yellow No. 93
0.16% "Wolframid 7" Resin (Polyamide Resin)
12.89% Mineral Oil (b) Physical Properties:
Appearance—a low dusting granular powder.
Size Analysis:

| <0.15 mm | 0.15-0.5 mm | 0.5-0.7 mm | >0.7 mm |
|---|---|---|---|
| 1.5% | 11.5% | 78% | 9.0% |

(c) Process Conditions:

| Temp. of pigment bed | 21° C. |
|---|---|
| Temp. of granulating agent | 70° C. |
| Air flow | 10-15m$^3$/hour |
| Pigment Charge | 250 parts (by weight) of CI Pigment Yellow 93 |
| Granulating agent | 37.5 parts (by weight) of composition: 1.2% "Wolframid 7" resin 98.8% Mineral Oil |
| Spraying Pressure | 0.2 atmosphere |
| Spraying Time | 5 minutes |
| Drying Time | — |

(d) Application Properties:

The application properties of the granules and the starting powder were compared by incorporating equal amounts of product in each case into a decorative paint medium. The resulting paints were then examined, and, within practical limits, it was found that the difference in colour strength which existed was commensurate with the amount of additive in the granular product.

EXAMPLE 11

Dry pigment powder was charged to the container of the apparatus shown in the FIGURE. The process is summarised as follows:

(a) Product Composition:
88.89% C.I. Pigment Yellow No. 34
8.89% Mineral Oil
0.44% Carboxy-methyl cellulose
1.78% Staybelite Resin (b) Physical Properties:
Appearance—a low dusting granular powder.

(c) Process Conditions:

| 1st Stage. | Temp. of pigment bed | 90° C. |
| | Temp. of granulating agent | 21° C. |
| | Air Flow | 10–15m³/hour |
| | Pigment Charge | 500 parts (by weight) CI Pigment Yellow 34 |
| | Granulating agent | 50 parts (by weight) Mineral Oil |
| | Spraying Pressure | 0.2 atmosphere |
| | Spraying Time | 12–14 minutes |
| | Drying Time | — |
| 2nd Stage. | Temp. of pigment bed | 90° C. |
| | Temp. of additive | 21° C. |
| | Air Flow | 10–15m³/hour |
| | Additive | 340 parts (by weight) of composition. 0.74% carboxy methylcellulose. 2.94% Staybelite Resin (present as Ammonium Staybelite) 5.28% Ammonia solution (SG = 0.880) 91.04% water |
| | Spraying Pressure | 0.2 atmosphere |
| | Spraying Time | 55 minutes |
| | Drying Time | 5 minutes |

(d) Application Properties:

The application properties of the granules and the starting powder were compared by incorporating equal amounts of pigment in each case into a decorative paint medium. The resulting paints where then examined, and, within practical limits, no differences in application properties were observed.

EXAMPLE 12

Dry pigment powder was charged to the container of the apparatus shown in the FIGURE. The process is summarised as follows:

(a) Product Composition:
86.95% CI Pigment Yellow 13
0.16% "Wolframid 7" Resin
12.89% Mineral Oil (b) Physical Properties:
Appearance—a low dusting granular powder.
Size Analysis:

| <0.15 mm | 0.15–0.3 mm | 0.3–0.5 mm | 0.5–0.7 mm | >0.7 mm |
|---|---|---|---|---|
| 4% | 11.6% | 39.3% | 36.4% | 8.7% |

(c) Process Conditions:

| Temp. of pigment bed | 90° C. |
|---|---|
| Temp. of granulating agent | 75° C. |
| Air Flow | 10–15m³/hour |
| Pigment Charge | 250 parts (by weight) of CI Pigment Yellow 13 |
| Granulating Agent | 37.5 parts (by weight) of composition: 1.2% "Wolframid 7" resin 98.8% Mineral Oil |
| Spraying Pressure | 0.2 atmosphere |
| Spraying Time | 9–10 minutes |
| Drying Time | — |

(d) Application Properties:

The application properties of the granules and the starting powder were compared by incorporating equal amounts of pigment in each case into a lithographic printing ink medium. The resulting printing inks were then examined and, within practical limits, no differences in application properties were observed.

EXAMPLE 13

Dry pigment powder was charged to the container of the apparatus shown in the Figure. The process is summarised as follows:

(a) Product Composition:
90.9% C.I. Pigment White No. 6
1.52% Pentalyn 255 (Maleic Condensate Restin)
7.58% 2-ethylhexanoic acid (b) Physical Properties:
Appearance—a low dusting granular powder.
Size Analysis:

| <0.15 mm | 0.15–0.5 mm | 0.5–1.0 mm | >1.0 mm |
|---|---|---|---|
| 5.8% | 24.8% | 47.7% | 21.7% |

(c) Process Conditions:

| Temp. of pigment bed | 90° C. |
|---|---|
| Temp. of granulating agent | 21° C. |
| Air Flow | 10–15m³/hour |
| Pigment Charge | 500 parts (by weight) of CI Pigment White 6 |
| Granulating agent | 50 parts (by weight) of composition 16.67% Pentalyn 255 resin 83.33% 2-ethylhexanoic acid |
| Spraying Pressure | 0.2 atmosphere |
| Spraying Time | 12 minutes |
| Drying Time | — |

(d) Application Properties:

The application properties of the granules and the starting powder were compared by incorporating equal amounts of product in each case into a decorative paint medium. The resulting paints were then examined, and, within practical limits, it was found that the difference in colour strength which existed was commensurate with the amount of additive in the granular product.

EXAMPLE 14

Dry pigment powder was charged to the container of the apparatus shown in the Figure. The process is summarised as follows:

(a) Product Composition:
90.91 C.I. Pigment White No. 6
9.09% Reomol D79/P (mixed phthalate plasticiser)
(b) Physical properties:
Appearance—a low dusting free flowing granular powder
Size Analysis:

| <0.15 mm | 0.15–0.3 mm | 0.3–1.0 mm | >1.0 mm |
|---|---|---|---|
| 17.7% | 28.8% | 27.8% | 25.7% |

(c) Process Conditions:

| | |
|---|---|
| Temp. of pigment bed | 90° C. |
| Temp. of granulating agent | 21° C. |
| Air Flow | 10–15m³/hour |
| Pigment Charge | 500 parts (by weight) of CI Pigment White 6 |
| Granulating agent | 50 parts (by weight) of Reomol D79/P |
| Spraying Pressure | 0.2 atmosphere |
| Spraying Time | 10–12 minutes |
| Drying Time | — |

(d) Application Properties:

The application properties of the granules and the starting powder were compared by incorporating equal amount of pigment in each case into a plasticised PVC. The resulting PVC hides were then examined and, within practical limits, the granulated product gave acceptable colouristic properties.

EXAMPLE 15

Dry pigment powder was charged to the container of the apparatus shown in the Figure. The process is summarised as follows:

(a) Product Composition:
87.93% CI Pigment Red No. 144
8.79% Solvesso 150 (Esso Ltd)
3.06% Staybelite Resin
0.22% Carboxy methyl cellulose
(b) Physical Properties:
Appearance—a low dusting granular powder.
Size Analysis:

| <0.15 mm | 0.15–0.3 mm | 0.3–0.5 mm | 0.5–1.0 mm | >1.0 mm |
|---|---|---|---|---|
| 7.5% | 20.3% | 15.3% | 35.3% | 21.6% |

(c) Process Conditions:

| | | |
|---|---|---|
| 1st Stage. | Temp. of pigment bed | 21° C. |
| | Temp. of granulating agent | 21° C. |
| | Air Flow | 10–15m³/hour |
| | Pigment Charge | 250 parts (by weight) of above pigment |
| | Granulating agent | 31.25 parts (by weight) of composition 20% Staybelite Resin 80% Mineral Oil |
| | Spraying Pressure | 0.2 atmosphere |
| | Spraying Time | 12–14 minutes |
| | Drying Time | —minutes |
| 2nd Stage. | Temp. of pigment bed | 90° C. |
| | Temp. of granulating agent | 21° C. |
| | Air Flow | 10–15m³/hour |
| | Granulating agent | 110 parts (by weight) of composition 0.57% Carboxymethyl cellulose 2.23% Staybelite Resin (as Ammonium Staybelite) 88.2% Water |
| | Spraying Pressure | 0.2 atmosphere |
| | Spraying Time | 20–25 minutes |
| | Drying Time | 5 minutes |

(d) Application Properties

The application properties of the granules and the starting powder were compared by incorporating equal amounts of product in each case into a decorative paint medium. The resulting paints were then examined, and within practical limits. It was found that the difference in colour strength which existed was commensurate with the amount of additive in the granular product.

EXAMPLE 16

Dry pigment powder was charged to the container of the apparatus shown in the Figure. The process is summarised as follows:

(a) Product Composition:
86.95% C.I. Pigment Red No. 144
13.05% Remol D79/P
(b) Physical Properties
Appearance—a low dusting granular powder
Size Analysis:

| <0.15 mm | 0.15–0.3 mm | 0.3–0.5 mm | 0.5–0.7 mm | 0.7–1.0 mm | >1.0 mm |
|---|---|---|---|---|---|
| 6.9% | 16.3% | 31.9% | 26.2% | 13.5% | 5.2% |

(c) Process Conditions:

| | |
|---|---|
| Temp. of pigment bed | 21° C. |
| Temp. of granulating agent | 21° C. |
| Air flow | 10–15m³/hour |
| Pigment Charge | 250 parts (by weight) of CI Pigment Red 144 |
| Granulating agent | 37.5 parts (by weight) of Reomol D79/P |
| Spraying Pressure | 0.2 atmosphere |
| Spraying Time | 10–12 minutes |
| Drying Time | — |

(d) Application Properties:

The application properties of the granules and the starting powder were compared by incorporating equal amounts of product in each case into a plasticised PVC. The resulting PVC hides were then examined, and, within practical limits, it was found that the difference in colour strength which existed was commensurate with the amount of additive in the granular product.

What we claim is:

1. An improved process for producing a substantially dry, low-dusting, free-flowing granular pigment product by treating a pigment in a fluidized bed with a granulating assistant wherein the improvement comprises the steps of
(a) forming a fluidized bed consisting essentially of pigment powder by blowing a stream of gas through the pigment powder;
(b) dispensing onto the fluidized bed of pigment a nonaqueous granulating assistant selected from the group consisting of:
  (i) a high boiling organic liquid;
  (ii) a mixture of a high boiling organic liquid and a resin;
  (iii) a mixture of a high boiling organic liquid and a wax;
  (iv) a mixture of a high boiling organic liquid, a resin and a wax; and
  (v) a molten wax;
said assistant being one which:
  ($\alpha$) wets out the pigment powder surface sufficiently to allow agglomeration of pigment particles so wetted out;
  ($\beta$) binds the granules so formed sufficiently strongly to enable them to resist breakdown during the process of the invention, and during subsequent handling and storage, but without adversely affecting dispersibility of the pigment product in any final application medium into which the pigment is to be incorporated; and
  ($\gamma$) is compatible with the final application medium;
(c) contacting the granules formed in step (b) with a surfactant; and
(d) removing the granular pigment so formed, which still contains the granulating assistant uniformly incorporated therein, from the fluidized bed.

2. A process as claimed in claim 1 wherein the pigment powder used in step (a) is produced in a dry grinding process.

3. A process as claimed in claim 1 wherein the pigment is an organic pigment selected from the group consisting of an azo pigment, an azomethine pigment, the metal salts and metal complexes of an azo or azomethine pigment, a metal-free phthalocyanine, a metal phthalocyanine, and a metal-free and metal phthalocyanine substituted by halogen; a quinacridone pigment; a dioxazine pigment; a vat dyestuff; an anthraquinone pigment; an isoindolinone pigment; and salts of basic pigments precipitated with the heteropoly acids of phosphorus, tungsten, molybdenum and copper ferrocyanide.

4. A process as claimed in claim 1 wherein the pigment is an inorganic pigment selected from the group consisting of titanium dioxide, red iron oxide, yellow iron oxide, carbon black, lead chrome, molybdenum chrome, prussian blue and cadmium red.

5. A process according to claim 1 wherein the organic liquid is selected from the group consisting of a straight chain aliphatic- and a cyclic-aliphatic hydrocarbon solvent having high boiling and flash points, mixtures of said aliphatic- and cyclic-aliphatic hydrocarbon solvents and aromatic solvents, conventional liquid plasticizers for PVC, dialkyl esters of phthalic acid, oleyl alcohol and other esters having a high boiling point.

6. A process according to claim 1 wherein the granulating assistant is selected from the group consisting of abietic acid and an ester thereof; diglycol monostearate and a cellulose acetobutyrate; and alkaline earth metal salt of a fatty acid having 12 to 20 carbon atoms; a fatty acid having 12 to 20 carbon atoms; a fatty alcohol; an amine having from 12 to 20 carbon atoms; a triglyceride of 12-hydroxystearic acid; a maleic or phenolic resin modified with abietic acid; a wood resin modified by hydrogenation or polymerization; a glyceryl ester of a modified resin; an alkyd resin; an alkyd resin with synthetic fatty acids; a linseed oil-based resin; a castor oil resin; and a polyester resin based on phthalic acid.

7. A process as claimed in claim 1 wherein the wax is selected from the group consisting of a paraffin wax, a $C_{12-22}$ fatty alcohol and a polyamide wax.

8. A process as claimed in claim 1 wherein the amount of the granulating assistant is from 5 to 20% based on the weight of the pigment.

9. A process as claimed in claim 1 wherein the pigment powder used in step (a) is produced in a sieving process.

10. An improved process for producing a substantially dry, low-dusting, free-flowing granular pigment product by treating a pigment in a fluidized bed with a granulating assistant wherein the improvement comprises the steps of
(a) forming a fluidized bed consisting essentially of pigment powder by blowing a stream of gas through the pigment powder, wherein said pigment powder has low dusting properties;
(b) dispensing onto the fluidized bed of pigment a nonaqueous granulating assistant selected from the group consisting of:
  (i) a high boiling organic liquid;
  (ii) a mixture of a high boiling organic liquid and a resin;
  (iii) a mixture of a high boiling organic liquid and a wax;
  (iv) a mixture of a high boiling organic liquid, a resin and a wax; and
  (v) a molten wax;
said assistant being one which:
  ($\alpha$) wets out the pigment powder surface sufficiently to allow agglomeration of pigment particles so wetted out;
  ($\beta$) binds the granules so formed sufficiently strongly to enable them to resist breakdown during the process of the invention, and during subsequent handling and storage, but without adversely affecting dispersibility of the pigment product in any final application medium into which the pigment is to be incorporated; and
  ($\gamma$) is compatible with the final application medium; and
(c) removing the granular pigment so formed, which still contains the granulating assistant uniformly incorporated therein, from the fluidized bed.

11. A process as claimed in claim 10 wherein the pigment powder used in step (a) is produced in a dry grinding process.

12. A process as claimed in claim 10 wherein the pigment powder used in step (a) is produced in a sieving process.

13. A process as claimed in claim 10 wherein the pigment is an organic pigment selected from the group consisting of an azo pigment, an azomethine pigment, the metal salts and metal complexes of an azo or azomethine pigment, a metal-free phthalocyanine, a metal phthalocyanine, and a metal-free and metal phthalocyanine substituted by halogen; a quinacridone pigment; a dioxazine pigment; a vat dyestuff; an anthraquinone pigment; an isoindolinone pigment; and salts of basic pigments precipitated with the heteropoly acids of phosphorus, tungsten, molybdenum and copper ferrocyanide.

14. A process as claimed in claim 10 wherein the pigment is an inorganic pigment selected from the group consisting of titanium dioxide, red iron oxide, yellow iron oxide, carbon black, lead chrome, molybdenum chrome, prussian blue and cadmium red.

15. A process according to claim 10 wherein the organic liquid is selected from the group consisting of a straight chain aliphatic- and a cyclic-aliphatic hydrocarbon solvent having high boiling and flash points, mixtures of said aliphatic- and cyclic-aliphatic hydrocarbon solvents and aromatic solvents, conventional liquid plasticizers for PVC, dialkyl esters of phthalic acid, oleyl alcohol and other esters having a high boiling point.

16. A process according to claim 10 wherein the granulating assistant is selected from the group consisting of abietic acid and an ester thereof; diglycol monostearate and a cellulose acetobutyrate; and alkaline earth metal salt of a fatty acid having 12 to 20 carbon atoms; a fatty acid having 12 to 20 carbon atoms; a fatty alcohol; an amine having from 12 to 20 carbon atoms; a triglyceride of 12-hydroxystearic acid; a maleic or phenolic resin modified with abietic acid; a wood resin modified by hydrogenation or polymerization; a glyceryl ester of a modified resin; an alkyd resin; an alkyd resin with synthetic fatty acids; a linseed oil-based resin; a castor oil resin; and a polyester resin based on phthalic acid.

17. A process as claimed in claim 10 wherein the wax is selected from the group consisting of a paraffin wax, a $C_{12-22}$ fatty alcohol and a polyamide wax.

18. A process as claimed in claim 10 wherein the amount of the granulating assistant is from 5 to 20%, based on the weight of the pigment.

* * * * *